US009263075B2

United States Patent
Uchida

(10) Patent No.: US 9,263,075 B2
(45) Date of Patent: Feb. 16, 2016

(54) MAGNETIC RECORDING MEDIUM FOR HEAT-ASSISTED RECORDING DEVICE AND MANUFACTURING METHOD THEREOF

(75) Inventor: Shinji Uchida, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 685 days.

(21) Appl. No.: 13/347,695

(22) Filed: Jan. 10, 2012

(65) Prior Publication Data

US 2012/0196154 A1    Aug. 2, 2012

(30) Foreign Application Priority Data

Feb. 2, 2011    (JP) ................. 2011-020908

(51) Int. Cl.
*G11B 5/65* (2006.01)
*G11B 5/66* (2006.01)
*G11B 5/72* (2006.01)

(52) U.S. Cl.
CPC .. *G11B 5/65* (2013.01); *G11B 5/66* (2013.01); *G11B 5/72* (2013.01); *Y10T 29/49021* (2015.01)

(58) Field of Classification Search
None
See application file for complete search history.

(56) References Cited

U.S. PATENT DOCUMENTS

2001/0025810 A1    10/2001    Ito
2002/0146592 A1*   10/2002    Futamoto et al. .......... 428/694 T
2008/0182134 A1*   7/2008     Hirayama et al. ......... 428/831.2
2009/0081484 A1    3/2009     Watanabe
2010/0159285 A1*   6/2010     Peng et al. .................... 428/832

FOREIGN PATENT DOCUMENTS

| JP | 09-320847 A   | 12/1997 |
| JP | 2001-291230 A | 10/2001 |
| JP | 2002-222517 A | 8/2002  |
| JP | 2005-071525 A | 3/2005  |
| JP | 2009-093780 A | 4/2009  |
| JP | 2010-129163 A | 6/2010  |
| JP | 2010-182386 A | 8/2010  |

OTHER PUBLICATIONS

Japanese Office Action dated on Sep. 9, 2014.

* cited by examiner

*Primary Examiner* — Mark Ruthkosky
*Assistant Examiner* — Linda Chau
(74) *Attorney, Agent, or Firm* — Rabin & Berdo, P.C.

(57) ABSTRACT

Disclosed are a magnetic recording medium for a heat-assisted recording device, which has a high SNR at high density, and a manufacturing method thereof. The magnetic recording medium includes a non-magnetic substrate; a magnetic recording layer; a protective layer; and a liquid lubricating layer. The magnetic recording layer has a granular structure formed by magnetic portions and non-magnetic portions that surround the magnetic portions in which the non-magnetic portions between adjacent magnetic portions are recessed with respect to the magnetic portions. The non-magnetic portions have a volume percentage based on total volume of the granular structure ranging from 15 vol % to 30 vol % and include a carbon-based material. The magnetic recording medium has a surface having an arithmetic mean roughness Ra and an average length of roughness curve elements RSm such that Ra/RSm ranges from 0.05 to 0.15.

20 Claims, 5 Drawing Sheets

MAGNETIC RECORDING MEDIUM FOR HEAT-ASSISTED RECORDING DEVICE AND MANUFACTURING METHOD THEREOF

CROSS-REFERENCE TO RELATED APPLICATION

This non-provisional Application claims the benefit of the priority of Applicant's earlier filed Japanese Patent Application Laid-open No. 2011-020908 filed Feb. 2, 2011, the entire contents of which are incorporated herein by reference.

BACKGROUND OF THE INVENTION

1. Field of the Invention

The present invention relates to a magnetic recording medium for heat-assisted recording devices, and to a method of manufacturing the magnetic recording medium.

2. Description of the Related Art

Perpendicular magnetic recording schemes are used as a technique for achieving magnetic recording media of higher density. Media (perpendicular magnetic recording media) in which magnetic recording is performed according to this scheme comprise a non-magnetic substrate that is formed out of a non-magnetic material, and a magnetic recording layer that is formed out of a magnetic material. The medium may further comprise, for instance, a backing formed of a soft magnetic material and that has the function of concentrating, in the magnetic recording layer, the magnetic flux that is generated by a magnetic head; a ground layer that orients the magnetic recording layer in a target direction; and a protective layer that protects the surface of the magnetic recording layer.

Magnetic recording layers for perpendicular magnetic recording media that have been proposed include, for instance, a magnetic recording layer (granular magnetic layer) having a granular structure resulting from adding a non-magnetic material such as $SiO_2$, $TiO_2$ or the like to an alloy material such as CoCrPt, CoCrTa or the like (Japanese Patent Application Publication No. 2001-291230). In a CoCrPt—$SiO_2$ granular magnetic layer, for instance, a $SiO_2$ non-magnetic material segregates so as to surround the periphery of CoCrPt magnetic crystal grains, so that the individual magnetic crystal grains of CoCrPt are magnetically isolated by the $SiO_2$ non-magnetic material.

In recent years, magnetization reversal units have become smaller as a result of a reduction in the size of magnetic crystal grains in granular magnetic layers. Recording bits, as signal units that are recorded by a magnetic head, have also become smaller. This entails a need for higher recording densities in perpendicular magnetic recording media. However, the thermal stability of recording magnetization drops as the size of the magnetic crystal grains decreases. Accordingly, it has been proposed to form magnetic crystal grains, in a granular magnetic layer, out of materials having higher magnetocrystalline anisotropy, in order to compensate for the drop in thermal stability that accompanies a reduction in the size of the magnetic crystal grains.

Herein, $L1_0$ ordered alloys are materials having the required high magneto-crystalline anisotropy. Various methods have been proposed for manufacturing thin films of $L1_0$ ordered alloys (Japanese Patent No. 3318204). Ordinarily, aluminum or glass-made non-magnetic substrates are used in magnetic recording media from the viewpoint of strength, impact resistance and so forth. A ground layer is important in a case where a $L1_0$ ordered alloy layer is formed on the surface of such a non-magnetic substrate. That is because, in order to impart high magnetocrystalline anisotropy to the magnetic crystal grains, the crystals of the $L1_0$ ordered alloy must take on a (001) orientation (the [001] axis of the crystals must be perpendicular to the substrate surface). Accordingly, MgO or $SrTiO_3$ are ordinarily used as underlayers, which have appropriate lattice misfit properties (high lattice matching) for $L1_0$ ordered alloys.

The thickness of the magnetic recording layer is uniform in the in-plane direction of the medium. Therefore, a smaller magnetization reversal unit translates into a smaller cross-sectional area keeping a constant height of the magnetization reversal unit. As a result, the demagnetizing field that acts on the magnetization reversal unit itself becomes smaller, and the switching field becomes greater. In terms of the shape of the magnetization reversal unit, a greater write magnetic field is required in order to increase the recording density required.

For the problem of writing ability, a recording scheme has been proposed, known as heat-assisted recording, which focuses on a combination of a magnetic recording medium and a head. Heat-assisted recording exploits the temperature dependence of the magnetic anisotropy constant Ku of magnetic materials, i.e., the characteristic whereby Ku becomes smaller at higher temperatures. In heat-assisted recording, the magnetic recording medium is heated to temporarily lower thereby the Ku of a magnetic recording layer and reduce the switching field as a result. Writing is carried out during that temporary interval. Once the temperature reverts (drops) to its earlier value, Ku takes on its original high value. A recording signal can be held stably as a result. In the manufacture of magnetic recording media that are appropriate for heat-assisted recording, the design of the magnetic recording layer mandates that temperature characteristics also be taken into consideration, in addition to conventional guidelines.

The transition width of the recording bit is determined by the size of the magnetization reversal unit of the magnetic recording medium and by the magnetic field gradient and temperature gradient of the head. The transition width of recording bits must be reduced in order to enhance recording density. In particular, it is important that the temperature gradient of a heating spot generated by a laser beam should be steep. Regarding this approach a method has been proposed where, for instance, a heat dissipation layer is provided within a magnetic recording medium (Japanese Patent Application Publication No. 2010-182386). The heat dissipation layer must have a thickness according to the heating spot, but, as described above, the heat dissipation effect of the heat dissipation layer is greater the thicker the layer is. A thicker heat dissipation layer, however, entails larger irregularities on the magnetic recording medium surface. Large irregularities in a layer that underlies the magnetic recording layer exert an influence on the fine structure of the overlying magnetic recording layer, in particular on the crystal orientability and size control of magnetic crystal grains, in that crystal orientability becomes poorer, and particle size variation becomes greater. An excessively large heat dissipation layer constitutes therefore an obstacle for achieving a high-density magnetic recording medium.

To deal with this problem, the abovementioned magnetic recording medium has a layer structure such that a soft magnetic underlayer is sandwiched between two heat dissipation layers. Preferably, the layer configuration is such that the heat dissipation layer and the soft magnetic underlayer have each a plurality of layers, and heat dissipation layers and soft magnetic underlayers are stacked alternately with each other. Methods have been disclosed thus wherein the heat dissipation effect is enhanced, the irregularities at the magnetic recording medium surface are reduced, and a higher density is achieved. Further, a magnetic recording medium has been proposed, as a medium compatible with heat-assisted recording, that combines high-density writing with control of the temperature characteristic (Japanese Patent Application Publication No. 2009-93780).

As described above, thickening of the heat dissipation layer with a view to enhancing the heat dissipation effect constitutes an obstacle for achieving a magnetic recording medium having higher density. In particular, excessively large irregularities at the magnetic recording medium surface result in unstable flying of the magnetic head, causing fluctuations of gap length during signal writing and reading, and resulting in lowered SNR (signal to noise ratio), among other drawbacks. If a configuration is resorted to wherein a soft magnetic underlayer is sandwiched between two heat dissipation layers, it becomes necessary to provide the number of chambers according to the number of the plurality of heat dissipation layers, during production in a vacuum batch film-formation line, from the bottom layer to the top layer. Thus, equipment costs undesirably increase in proportion to the number of chambers.

SUMMARY OF THE INVENTION

In the light of the above considerations, it is an object of the present invention to provide a magnetic recording medium for a heat-assisted recording device wherein the magnetic recording medium has high density and enhanced SNR.

In order to solve the abovementioned drawbacks, the invention provides, as a first aspect, a magnetic recording medium for a heat-assisted recording device, comprising, in the order recited: a non-magnetic substrate; a magnetic recording layer; a protective layer; and a liquid lubricating layer, wherein the magnetic recording layer has a granular structure formed by a magnetic portion and a non-magnetic portion that surrounds the magnetic portion, the non-magnetic portion having a volume percentage based on total volume of the granular structure ranging from 15 vol % to 30 vol % and including a carbon-based material, and wherein the magnetic recording medium has a surface having an arithmetic mean roughness Ra and an average length of roughness curve elements RSm such that Ra/RSm ranges from 0.05 to 0.15.

Alternatively, the invention provides a magnetic recording medium for a heat-assisted recording device, comprising, in the order recited: a non-magnetic substrate; a magnetic recording layer comprising, in the order recited, a lower magnetic recording layer, an exchange coupling control layer, and an upper magnetic recording layer; a protective layer; and a liquid lubricating layer, wherein the lower magnetic recording layer and the upper magnetic recording layer each have a granular structure formed by a magnetic portion and a non-magnetic portion that surrounds the magnetic portion, each respective non-magnetic portion having a volume percentage ranging from 15 vol % to 30 vol %, and at least one of the lower magnetic recording layer and the upper magnetic recording layer including a carbon-based material, and wherein the magnetic recording medium has a surface having an arithmetic mean roughness Ra and an average length of roughness curve elements RSm such that Ra/RSm ranges from 0.05 to 0.15.

The invention additionally provides, as a second aspect, a method for manufacturing a magnetic recording medium for a heat-assisted recording device, comprising the steps of: providing a non-magnetic substrate; forming a magnetic recording layer on the non-magnetic substrate, the magnetic recording layer having a granular structure formed by a magnetic portion and a non-magnetic portion that surrounds the magnetic portion; forming a protective layer on the magnetic recording layer; and forming a liquid lubricating layer on the protective layer, wherein the non-magnetic portion has a volume percentage based on total volume of the granular structure that ranges from 15 vol % to 30 vol %, and includes a carbon-based material.

Alternatively, the invention provides a method for manufacturing a magnetic recording medium for a heat-assisted recording device, comprising the steps of: forming a lower magnetic recording layer on a non-magnetic substrate; forming an exchange coupling control layer on the lower magnetic recording layer; forming an upper magnetic recording layer on the exchange coupling control layer; forming a protective layer on the upper magnetic recording layer; and forming a liquid lubricating layer on the protective layer; wherein the lower magnetic recording layer and the upper magnetic recording layer each have a granular structure formed of a magnetic portion and a non-magnetic portion that surrounds the magnetic portion; the proportion of the non-magnetic portion in the granular structure ranges from 15 vol % to 30 vol %; and the non-magnetic portion of the granular structure of at least one from among the lower magnetic recording layer and the upper magnetic recording layer includes a carbon-based material.

In the first aspect and the second aspect, the carbon-based material is preferably C, and, preferably, the volume percentage of the non-magnetic portion in the granular structure ranges from 20 vol % to 30 vol %. Alternatively, the carbon-based material is preferably $B_4C$. Preferably, there is further provided at least one layer selected from the group consisting of a soft magnetic underlayer, an interlayer, and a heat sink layer, between the non-magnetic substrate and the magnetic recording layer. Alternatively, there is preferably further formed at least one layer selected from the group consisting of a soft magnetic underlayer, an interlayer, and a heat sink layer, between the non-magnetic substrate and the magnetic recording layer.

The present invention succeeds in providing a magnetic recording medium for a heat-assisted recording device wherein the magnetic recording medium has high density and enhanced SNR, and in providing a magnetic recording medium for a heat-assisted recording device wherein the magnetic recording medium has excellent read-write characteristics. As described in detail below, the inventor found that a magnetic recording medium having excellent heat dissipation characteristics and suitable for high recording density could be provided by using, in a magnetic recording layer, a material such that, in a granular structure formed of a magnetic portion and a non-magnetic portion that surrounds the magnetic portion, the non-magnetic portion is recessed with respect to the magnetic portion. The inventor found that forming appropriate irregularities in a magnetic recording layer allows providing a magnetic recording medium for a heat-assisted recording device wherein the magnetic recording medium has high density and enhanced SNR.

DETAILED DESCRIPTION OF THE INVENTION

Preferred embodiments of the present invention are explained below with reference to accompanying drawings.

Figure 1:
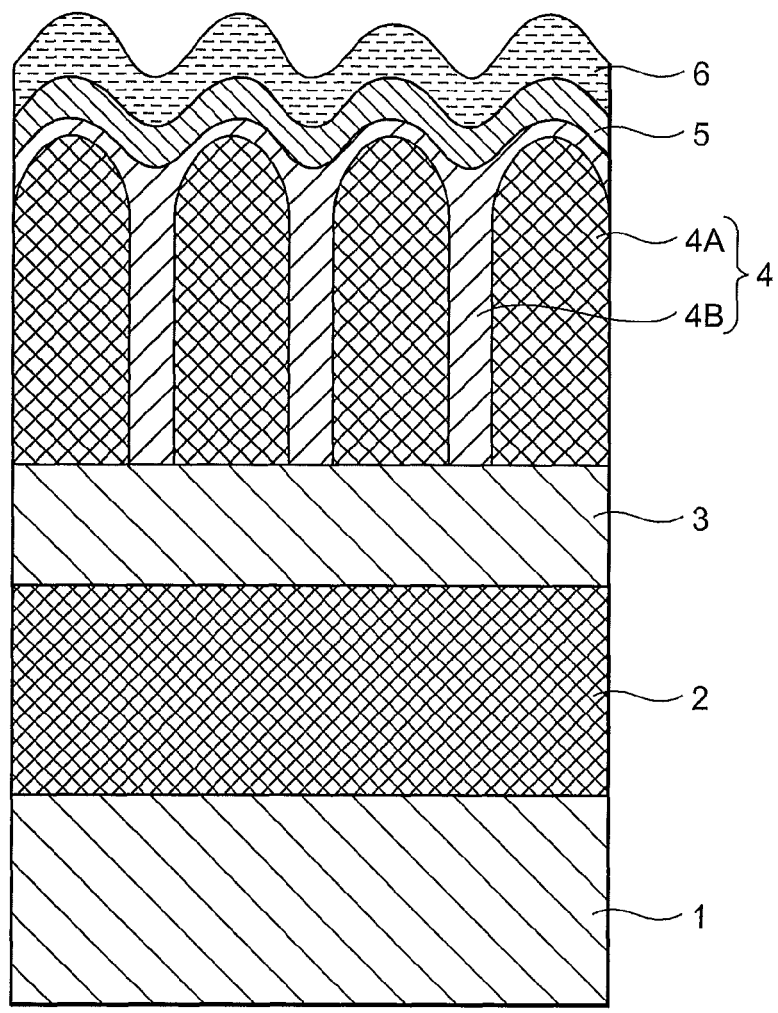
FIG. 1 is a schematic cross-sectional diagram for explaining one embodiment of a magnetic recording medium of the present invention.
Figure 6:
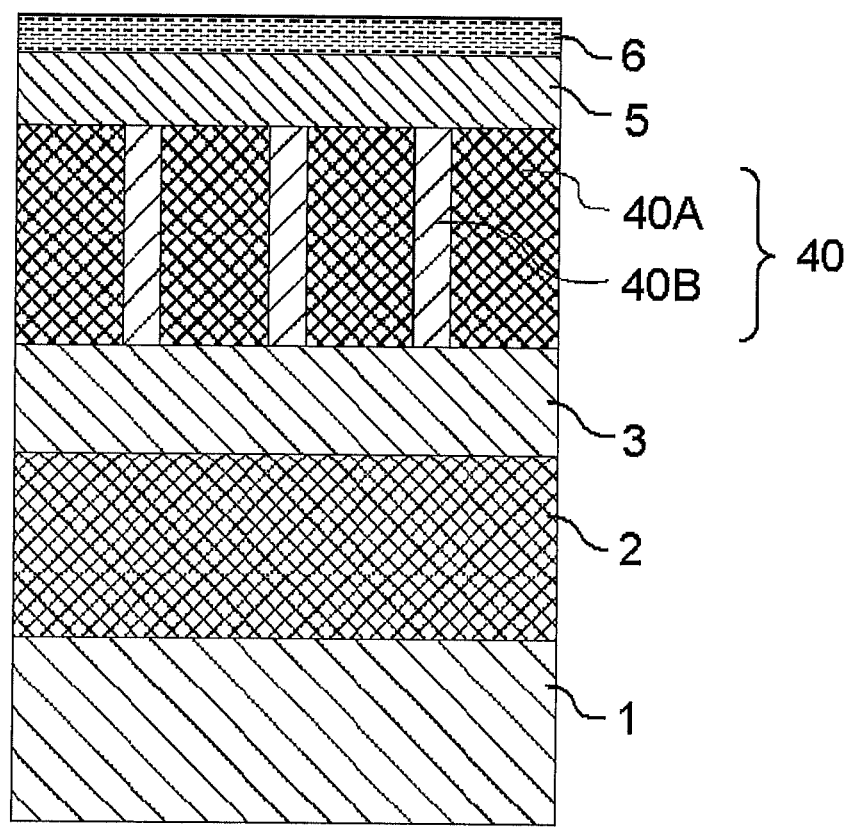
FIG. 6 is a schematic cross-sectional diagram for explaining a configuration example of a conventional magnetic recording medium.

FIG. 1 is a schematic cross-sectional diagram for explaining one embodiment of a magnetic recording medium of the present invention. FIG. 6 is a schematic cross-sectional diagram for explaining a configuration example of a conventional magnetic recording medium. In FIG. 1 and FIG. 6, there are provided a non-magnetic substrate 1, plus a soft magnetic underlayer 2, an interlayer 3, a magnetic recording layer 4 (40), a protective layer 5 and a liquid lubricating layer 6, in this order, on the non-magnetic substrate 1.

As the non-magnetic substrate 1 there can be used various substrates having a smooth surface. For instance, there can be used a Ni—P plated Al alloy, reinforced glass, crystallized glass or the like, that are used in magnetic recording media.

The soft magnetic underlayer 2 is formed preferably to enhance the reading and writing characteristics through control of the magnetic flux from the magnetic head. This layer can be omitted. As the soft magnetic underlayer 2 there can be used, for instance, a crystalline NiFe alloy, a sendust (FeSiAl) alloy, a CoFe alloy or the like, or micro-crystalline FeTaC, CoFeNi, CoNiP or the like. The optimal value of the thickness of the soft magnetic underlayer 2 varies depending on the structure and characteristics of the magnetic head that is used for magnetic recording. Preferably, however, the thickness of the soft magnetic underlayer 2 ranges from 10 nm to 500 nm, in a trade-off with productivity, in a case where the soft magnetic underlayer 2 is formed continuously with other layers. Ordinarily, a sputtering method is resorted to as the method for forming the soft magnetic underlayer 2.

The interlayer 3 is used for the purpose of securing the adhesion of the soft magnetic underlayer 2 and the magnetic recording layer 4 and of controlling the crystal grain size and the crystal orientation of the magnetic recording layer 4. The interlayer 3 can be omitted. Therefore, the crystalline structure of the interlayer 3 must be appropriately selected in accordance with the overlying magnetic recording layer material, although a non-crystalline material can also be used within the interlayer 3. For instance, when the material used in the magnetic recording layer 4 directly over the interlayer 3 has Co as a main component and has a hexagonal close packing (hcp) structure, a material for the interlayer 3 are preferably the same hcp structure or having a face centered cubic (fcc) structure. Specifically, Ru, Re, Rh, Pt, Pd, Ir, Ni, Co or an alloy material comprising thereof is preferably used in the interlayer 3. As the interlayer 3 there can be used NiW, Ta, Cr, Ru, MgO, or an alloy comprising thereof, or a stack of a plurality of layers of the foregoing, in a case where the material used in the magnetic recording layer 4 is a material having CoPt or FePt as main components and having a $L1_0$ ordered structure. The thickness of the interlayer 3 is selected in terms of enhancing crystallinity of the magnetic recording layer 4, and in terms of durability, read-write characteristics, and a trade-off with productivity. The thinner the interlayer 3 is, the stronger the head magnetic field and the greater the ease of writing, but preferably the thickness of the interlayer 3 ranges from 5 nm to 100 nm.

Figure 3:
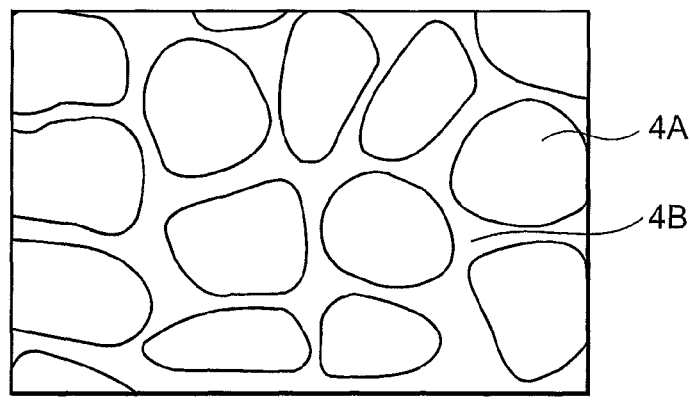
FIG. 3 is a plan-view diagram illustrating an example of a granular structure of a magnetic recording layer.

The magnetic recording layer 4 comprises a layer having a granular structure. FIG. 3 illustrates an example of a plan-view diagram of the granular structure of the magnetic recording layer 4. In the granular structure, columnar magnetic portions (also referred to as magnetic grains) 4A having a magnetic element as a main component are spaced apart from each other (are surrounded) by a non-magnetic portion 4B. The pitch of the magnetic portions 4A is preferably short, in order to cope with increased recording density, but the magnetic portions 4A themselves are preferably large, on account of the problem of heat fluctuation and in terms of signal reading. Accordingly, the non-magnetic portion 4B is preferably as narrow as possible, within a range that allows reducing the magnetic coupling between the magnetic portions 4A. The diameter of the magnetic portions 4A ranges preferably from 3 nm to 10 nm, and the width of the non-magnetic portion 4B ranges preferably from 0.1 nm to 4 nm. The proportion of the non-magnetic portion 4B in the magnetic recording layer 4 ranges from 15 vol % to 30 vol %. This allows obtaining, as a result, a magnetic recording medium having good signal characteristics at a high recording density.

Preferably, CoPt alloy magnetic grains containing a metal such as Cr, B, Ta, W or the like are used as the magnetic portions 4A of the magnetic recording layer. The magnetic recording layer 4 can be formed, for instance, using a sputtering method (DC magnetron sputtering) that employs a target comprising a mixture of a material that makes up the magnetic portions 4A and a material that makes up the non-magnetic portion 4B. An $L1_0$ ordered alloy, which is a magnetic material having high Ku, can be used as the magnetic portions 4A. As the $L1_0$ ordered alloy there can be used CoPt or FePt, or CoPt or FePt alloy containing Ni, Cu or the like. The non-magnetic portion 4B is preferably as thin as possible, within a range that allows reducing the magnetic coupling between the magnetic portions 4A. Accordingly, a material that isolates magnetically the magnetic portions 4A and that has little solid solubility in the magnetic portions 4A is preferably used as the non-magnetic portion 4B. For instance, an oxide, a carbon-based material or a mixture of an oxide and a carbon-based material can be used as the non-magnetic portion 4B. The oxide can be $SiO_2$, $TiO_2$, MgO or the like. The carbon-based material can be carbon (C) or various carbides such as $B_4C$, BC, SiC or the like. In the below-described Examples 1 and 3, $B_4C$ and C are respectively used in the non-magnetic portion 4B, but the material of the non-magnetic portion 4B is not limited thereto.

The protective layer 5 can be a hard protective layer conventionally used, and may be, for instance, a hard protective layer having mainly carbon. The protective layer 5 can be a single layer, or a stack of two layers of carbon of dissimilar nature, or a stack of a metal layer and a carbon layer, or a stack of an oxide layer and carbon.

A lubricant, for instance a perfluoropolyether-based lubricant can be used as the liquid lubricating layer 6. The liquid lubricating layer 6 can be formed using various lubrication materials that are ordinarily employed as liquid lubricating layer materials in magnetic recording media.

As explained below, the magnetic recording layer in the present invention may be made up of a stack of a plurality of magnetic materials. In this case, the stack of a plurality of magnetic materials has an ECC (Exchange-Coupled Composite) structure in which exchange coupling control layers are spaced apart from each other. In this case, at least one layer in the stack of the plurality of magnetic materials has a granular structure wherein a magnetic portion is surrounded by a non-magnetic portion (formed from a carbon-based material). As described below, preferably, only the upper magnetic recording layer, in the stack of a plurality of magnetic materials, includes a carbon-based material. In another embodiment, it may be the lower magnetic recording layer alone that includes a carbon-based material. Alternatively, either from among the upper magnetic recording layer and the lower magnetic recording layer may include a carbon-based material.

Figure 2:
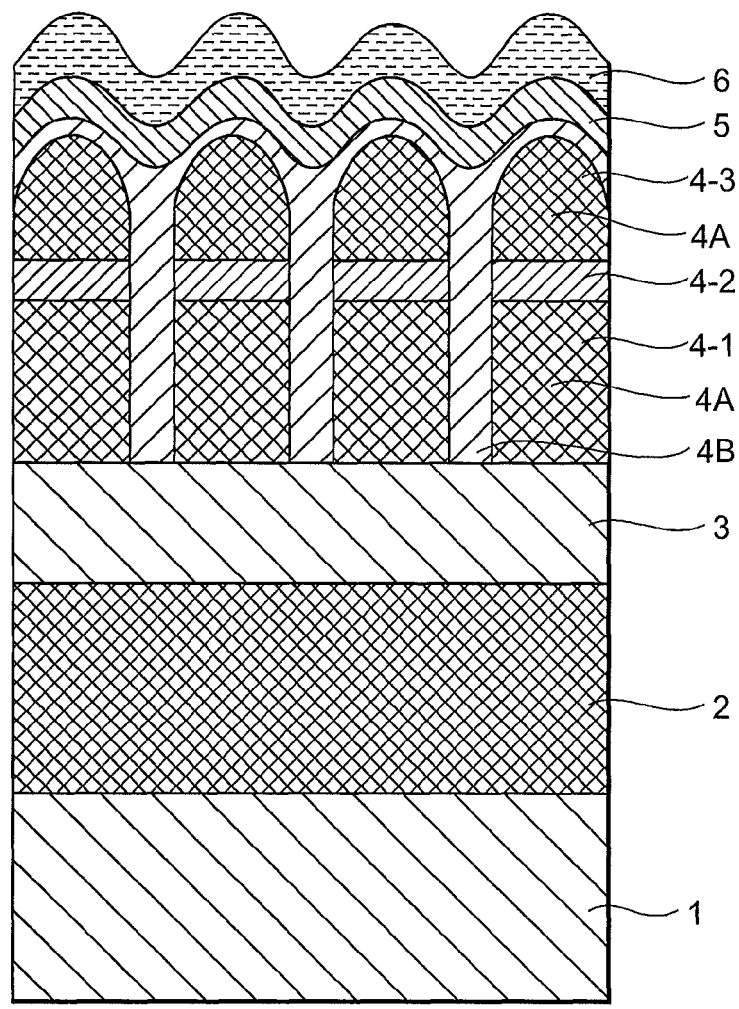
FIG. 2 is a schematic cross-sectional diagram for explaining another embodiment of a magnetic recording medium of the present invention, depicting an example wherein a stack of a plurality of magnetic materials comprises three layers, namely a lower magnetic recording layer, an upper magnetic recording layer, and a exchange coupling control layer therebetween.

FIG. 2 is a schematic cross-sectional diagram for explaining another embodiment of a magnetic recording medium of the present invention. FIG. 2 illustrates an example of a configuration wherein the above-described stack of a plurality of magnetic materials comprises three layers, namely, a lower magnetic recording layer 4-1, an upper magnetic recording layer 4-3, and an exchange coupling control layer 4-2 between the foregoing. As illustrated in FIG. 2, since two magnetic portions 4A are situated at a same position vertically coincide with each other, and since the non-magnetic portion 4B surrounds the magnetic portions 4A, the portion from the lower-side magnetic portions 4A to the upper-side magnetic portions 4A has a structure that is grown, in the form of columns, from the lower magnetic recording layer 4-1 to the upper magnetic recording layer 4-3 across the exchange coupling control layer 4-2. In such a structure, the portions from the lower magnetic portions 4A to the upper magnetic portions 4A constitute magnetization reversal units that are mutually coupled to each other and that are independent from each other by being separated by the non-magnetic portion 4B. In terms of striking a balance between writing and reading of recording signals in the magnetic recording layer, the thickness of the abovementioned stack ranges preferably from 5 nm to 50 nm.

In the heat-assisted recording device, recording bits are controlled on the basis of a regional temperature difference among the magnetic recording layers of the magnetic recording medium, i.e. signals are written in a high-temperature region and no recording is performed in low-temperature regions. Preferably, only a recording bit region of the magnetic recording medium is heated to a signal recording temperature by means of a laser for a heat-assisted head, and after recording, the recording bit region is cooled quickly to a temperature that is lower than the signal recording temperature. As a result, it is necessary to increase the heat dissipation of the magnetic recording layer. In the magnetic recording medium of FIG. 1 and FIG. 2, the surface area of the magnetic recording medium is greater, on account of the moderate irregularities that are formed in the magnetic recording layer of the magnetic recording medium, than in the case of the conventional magnetic recording medium illustrated in FIG. 6. Heat dissipation at the surface of the magnetic recording medium is significantly enhanced as a result. The magnetic recording medium rotates at high speed during reading and writing in a hard disk drive, and air flows at high-speed between the magnetic recording medium and a slider, so that the magnetic head floats on account of this flow of air. In the magnetic recording medium of the present invention, the flow of air at the surface is upset on account of the increased surface area of the magnetic recording medium. As a result, thermal diffusion from the surface of the magnetic recording medium becomes greater, and heat dissipation is significantly enhanced.

The following explanation applies, in particular, to the increased cooling effect elicited by irregularities in the magnetic recording medium surface in a case where an exchange coupling control layer is used. Generally, as formation of a given layer proceeds and the layer becomes accordingly thicker, magnetic grains (magnetic portions) swell to a larger size on account of crystal growth in an in-plane direction. The size of the formed magnetic grains does not increase if film formation is discontinued halfway and then resumed. That is, when crystal growth is discontinued temporarily and then resumed while film thickness is still small, the magnetic grains formed as a result are smaller than in a case where crystal growth proceeds uninterrupted. For instance, the size of the obtained magnetic grains is different between a case in which a 10 nm layer is formed continuously and a case in which a 5 nm layer is formed, then film formation is discontinued, and a further 5 nm layer is formed thereafter. The size of the obtained magnetic grains is smaller in the latter case, i.e. in the case of two separate layer formations. That is because crystal growth of the magnetic grains is reset temporarily, and then starts again. In the example illustrated in FIG. 2 of the present application, the exchange coupling control layer 4-2 is formed cutting across the magnetic recording layer (i.e. is formed between the lower magnetic recording layer 4-1 and the upper magnetic recording layer 4-3). The magnetic grains can be rendered smaller and the recording density of the magnetic recording medium can be further enhanced as a result, for the abovementioned reasons. In a case where the materials that make up the magnetic recording layer are identical, the difference in surface energy between the magnetic portion and the non-magnetic portion is identical, and hence the forces that give rise to the roughness or irregularities of the magnetic portion and non-magnetic portion of the magnetic recording layer are likewise identical. Accordingly, Ra/RSm increases if the magnetic grains are small and the roughness or irregularities are identical. As a result, it becomes possible to further increase the cooling effect through increase of the area of the magnetic recording medium surface. Layers can be designed to appropriate values of coercivity Hc and Curie temperature Tc through ECC by using a materials having dissimilar coercivity Hc and Curie temperature Tc.

The inventor found out that incorporating a carbon-based material such as C or $B_4C$ into the non-magnetic portion 4B causes the non-magnetic portion 4B to be recessed with respect to the magnetic portions 4A, and allows forming irregularities in the magnetic recording layer of the magnetic recording medium. The inventor found that the SNR characteristic and write track width are related to the height or depth and pitch of the irregularities of the magnetic recording medium surface. Specifically, the inventor found that good SNR characteristic and write track width can be obtained when the arithmetic mean roughness Ra and average length of curve elements RSm according to JIS B 0601 are such that Ra/RSm ranges from 0.05 to 0.15, as in the below-described examples.

A heat sink layer may be formed out of a material having high thermal conductivity between the non-magnetic substrate and the soft magnetic underlayer, provided that the number of chambers used during production of the magnetic recording medium does not increase significantly as a result. In this case, preferably, the heat sink layer is of Cu, Al or Ag, which have high thermal conductivity, or of an alloy having any of the foregoing as a main component.

The layers that are stacked on the non-magnetic substrate 1 can be formed in accordance with various film formation techniques that are ordinarily employed in the field of magnetic recording media. Except for the liquid lubricating layer, the various layers can be formed, for instance, by DC magnetron sputtering, or vacuum vapor deposition. For instance, a dipping method or spin coating method can be used for forming the liquid lubricating layer. The method for forming the liquid lubricating layer, however, is not limited thereto.

EXAMPLES

Examples and comparative examples of the magnetic recording medium and manufacturing method thereof according to the present invention are explained in detail below.

Example 1

In Example 1, there was manufactured a perpendicular magnetic recording medium having: a CoZrNb soft magnetic underlayer, a NiCrMo/Ru interlayer, a CoCrPt granular magnetic recording layer having a three-layer structure (including a Ru exchange coupling control layer), a C protective layer and a liquid lubricating layer.

As the non-magnetic substrate there was used a smooth-surface chemically strengthened glass substrate (N-10 glass substrate, by HOYA). The glass substrate was washed and was introduced into a sputtering apparatus, and a CoZrNb non-crystalline soft magnetic underlayer 50 nm thick was formed using a CoZrNb target. Next there was formed an interlayer having a two-layer structure comprising a NiCrMo layer and a Ru layer. Specifically, a NiCrMo layer 5 nm thick was formed using a NiCrMo target, and a Ru layer 20 nm thick was formed thereon using a Ru target.

As a lower magnetic recording layer there was formed next a CoCrPt—TiO$_2$ layer 6 nm thick, using a (100−x) vol % (Co$_{70}$Cr$_{10}$Pt$_{20}$)-x vol %(TiO$_2$) target (x=10 to 45) resulting from mixing TiO$_2$ and Co$_{70}$Cr$_{10}$Pt$_{20}$ with a proportion of TiO$_2$ identical to the B$_4$C proportion x given in Table 1. On the lower magnetic recording layer there was formed a Ru layer 0.1 nm thick as an exchange coupling control layer. As the upper magnetic recording layer there was further formed a CoCrPt—B$_4$C layer 10 nm thick, using a (100−x) vol %(Co$_{80}$Cr$_{15}$Pt$_5$)-x vol % B$_4$C target (x=10 to 45) resulting from mixing Co$_{80}$Cr$_{15}$Pt$_5$ and B$_4$C at the B$_4$C proportion x set forth in Table 1, to yield a magnetic recording layer having a three-layer structure.

TABLE 1

Results of Example 1

| B$_4$C proportion x (vol %) | Ra (nm) | RSm (nm) | Ra/RSm | SNR (dB) | Write track width (nm) | Assessment |
|---|---|---|---|---|---|---|
| 10 | 0.28 | 8.4 | 0.033 | 14.9 | 98 | Defective |
| 15 | 0.45 | 7.9 | 0.057 | 14.8 | 89 | Good |
| 20 | 0.55 | 7.5 | 0.073 | 14.5 | 85 | Good |
| 25 | 0.7 | 6.9 | 0.101 | 13.5 | 82 | Good |
| 30 | 0.95 | 6.5 | 0.146 | 12.6 | 81 | Good |
| 35 | 1.05 | 6.3 | 0.167 | 9.6 | 79 | Defective |
| 40 | 1.18 | 6.0 | 0.197 | 8.2 | 77 | Defective |
| 45 | 1.22 | 5.5 | 0.222 | 7.7 | 75 | Defective |

Lastly, a protective layer 2 nm thick comprising C was formed using a carbon target, and then the whole was removed from the vacuum device.

All the layers were formed by DC magnetron sputtering in an Ar gas atmosphere.

Thereafter, a liquid lubricating layer 2 nm thick comprising perfluoropolyether was formed by dipping, to yield a perpendicular magnetic recording medium.

Comparative Example 2

In Comparative Example 2 there was manufactured a magnetic recording medium according to the same procedure as in Example 1, except that herein the magnetic recording layer was built up according to the below-described procedure.

As the lower magnetic recording layer, specifically, there was formed a CoCrPt—TiO$_2$ layer 6 nm thick, using a (100−y) vol %(Co$_{70}$Cr$_{10}$Pt$_{20}$)-y vol %(TiO$_2$) target (y=10 to 50) resulting from mixing Co$_{70}$Cr$_{10}$Pt$_{20}$ and TiO$_2$, with TiO$_2$ at a proportion identical to the SiO$_2$ proportion y given in Table 2. On the lower magnetic recording layer there was formed a Ru layer 0.1 nm thick as an exchange coupling control layer. As the upper magnetic recording layer there was formed a CoCrPt—SiO$_2$ layer 10 nm thick, using a (100−y) vol %(Co$_{80}$Cr$_{15}$Pt$_5$)-y vol % SiO$_2$ target (y=10 to 50) resulting from mixing Co$_{80}$Cr$_{15}$Pt$_5$ and SiO$_2$ at the SiO$_2$ proportion y given in Table 2.

TABLE 2

Results of Comparative Example 2

| SiO$_2$ proportion y (vol %) | Ra (nm) | RSm (nm) | Ra/RSm | SNR (dB) | Write track width (nm) | Assessment |
|---|---|---|---|---|---|---|
| 10 | 0.25 | 7.8 | 0.032 | 15.1 | 99 | Defective |
| 15 | 0.25 | 7.3 | 0.034 | 14.9 | 98 | Defective |
| 20 | 0.27 | 6.9 | 0.039 | 14.4 | 95 | Defective |
| 25 | 0.27 | 6.6 | 0.041 | 13.5 | 93 | Defective |
| 30 | 0.29 | 6.3 | 0.046 | 12.7 | 93 | Defective |
| 35 | 0.28 | 5.9 | 0.047 | 11.9 | 92 | Defective |
| 40 | 0.28 | 5.8 | 0.048 | 11.0 | 91 | Defective |
| 45 | 0.28 | 5.8 | 0.048 | 10.8 | 91 | Defective |
| 50 | 0.30 | 5.7 | 0.053 | 9.8 | 88 | Defective |

Example 3

In Example 3 a perpendicular magnetic recording medium was manufactured that had a non-magnetic substrate and, sequentially provided thereon, a CoZrNb soft magnetic underlayer, a NiCrMo/MgO interlayer, a ordered-alloy FePt granular magnetic recording layer, a C protective layer and a liquid lubricating layer.

As the non-magnetic substrate there was used a smooth-surface chemically strengthened glass substrate (N-10 glass substrate, by HOYA). The glass substrate was washed and was introduced into a sputtering apparatus. A CoZrNb non-crystalline soft magnetic underlayer 50 nm thick was formed using a CoZrNb target. Next there was formed an interlayer having a two-layer structure comprising a NiCrMo layer and an MgO layer. Specifically, a NiCrMo layer 5 nm thick was formed using a NiCrMo target, and an MgO layer 20 nm thick was formed thereon using an MgO target.

Next, a magnetic recording layer was obtained in the form of a Fe$_{50}$Pt$_{50}$—C layer 10 nm thick, using a (100−z) vol %(Fe$_{50}$Pt$_{50}$)-z vol % C target (z=10 to 40) resulting from mixing Fe$_{50}$Pt$_{50}$ and C at the C proportion z set forth in Table 3.

TABLE 3

Results of Example 3

| C proportion z (vol %) | Ra (nm) | RSm (nm) | Ra/RSm | SNR (dB) | Write track width (nm) | Assessment |
|---|---|---|---|---|---|---|
| 10 | 0.47 | 9.6 | 0.049 | 13.5 | 95 | Defective |
| 20 | 0.78 | 8.8 | 0.084 | 12.9 | 86 | Good |
| 30 | 1.08 | 8.1 | 0.133 | 12.0 | 83 | Good |
| 40 | 1.33 | 7.6 | 0.175 | 9.3 | 79 | Defective |

Lastly, a protective layer 2 nm thick comprising C was formed using a carbon target, and then the whole was removed from the vacuum device.

Except for the MgO layer, all the layers were formed by DC magnetron sputtering in an Ar gas atmosphere. The MgO layer was formed by RF sputtering in an Ar gas atmosphere.

Thereafter, a liquid lubricating layer 2 nm thick comprising perfluoropolyether was formed by dipping, to yield a perpendicular magnetic recording medium.

Evaluation results of Examples 1 and 3 and Comparative Example 2 are explained below. The surface roughness state was observed by cross-sectional TEM microscopy. A 100 nm-wide region at an appropriate position of each sample was observed by cross-sectional TEM microscopy, and the arithmetic mean roughness Ra and average length of roughness curve elements RSm were measured, according to JIS B 0601, simultaneously with checking of the irregularities (roughness) of the magnetic recording medium surface. Electromagnetic conversion characteristics were measured using a magnetic recording head provided with an optical waveguide for guiding light of 785 nm wavelength, emitted by a semiconductor laser, and provided with a scatterer for generating near-field light. Upon writing, semiconductor laser light of 100 mW was generated in such a manner that the energy of near-field light could be incident over a width of about 80 nm in the cross track direction. The width of the head writing pole in cross track direction was 200 nm, and the output of the maximum head magnetic field was set to 5 kOe (398 A/mm). During reading and writing, a 2.5-inch magnetic recording medium was rotated at 5400 rpm, and reading and writing were performed at a middle-radius portion of the substrate of the magnetic recording medium. The SNR characteristic and write track width were measured. The half-width value of the track profile was taken as the write track width.

Figure 4:
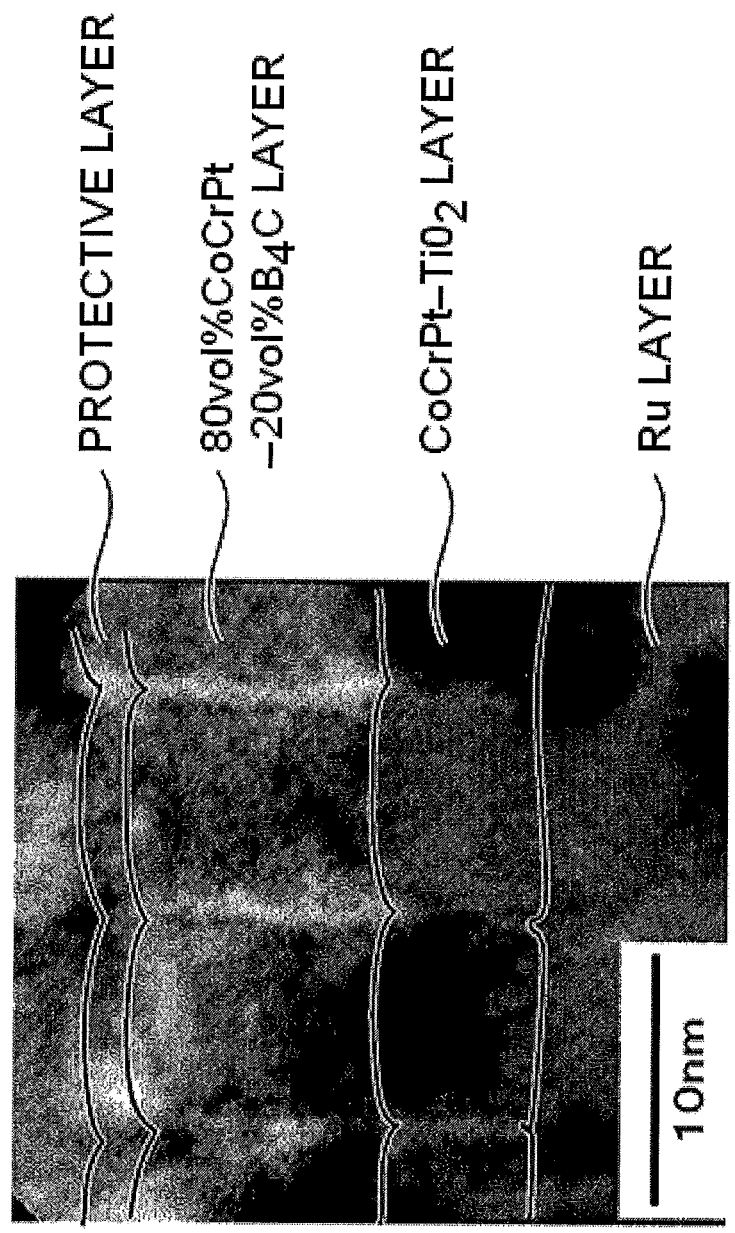
FIG. 4 is an observation example of a TEM image of an upper magnetic recording layer formed out of a 80 vol % $Co_{80}Cr_{15}Pt_5$)-20 vol % $B_4C$ target, in Example 1.

FIG. 4 illustrates TEM observation results of a sample of Example 1 in which the upper magnetic recording layer was formed out of a 80 vol % $Co_{80}Cr_{15}Pt_5$-20 vol % $B_4C$ target (x=20 in Table 1). Virtually no irregularities can be observed at the Ru interlayer surface, while substantial irregularities are present at the CoCrPt—$B_4C$ layer surface. The results of the observations on the various samples of Example 1 revealed that although virtually no irregularities were seen at the surface of layers lower than the magnetic recording layer, surface irregularities were visible at layers from the magnetic recording layer upwards, in a cross-sectional structure with x equal to or higher than 15 in Example 1.

Figure 5:
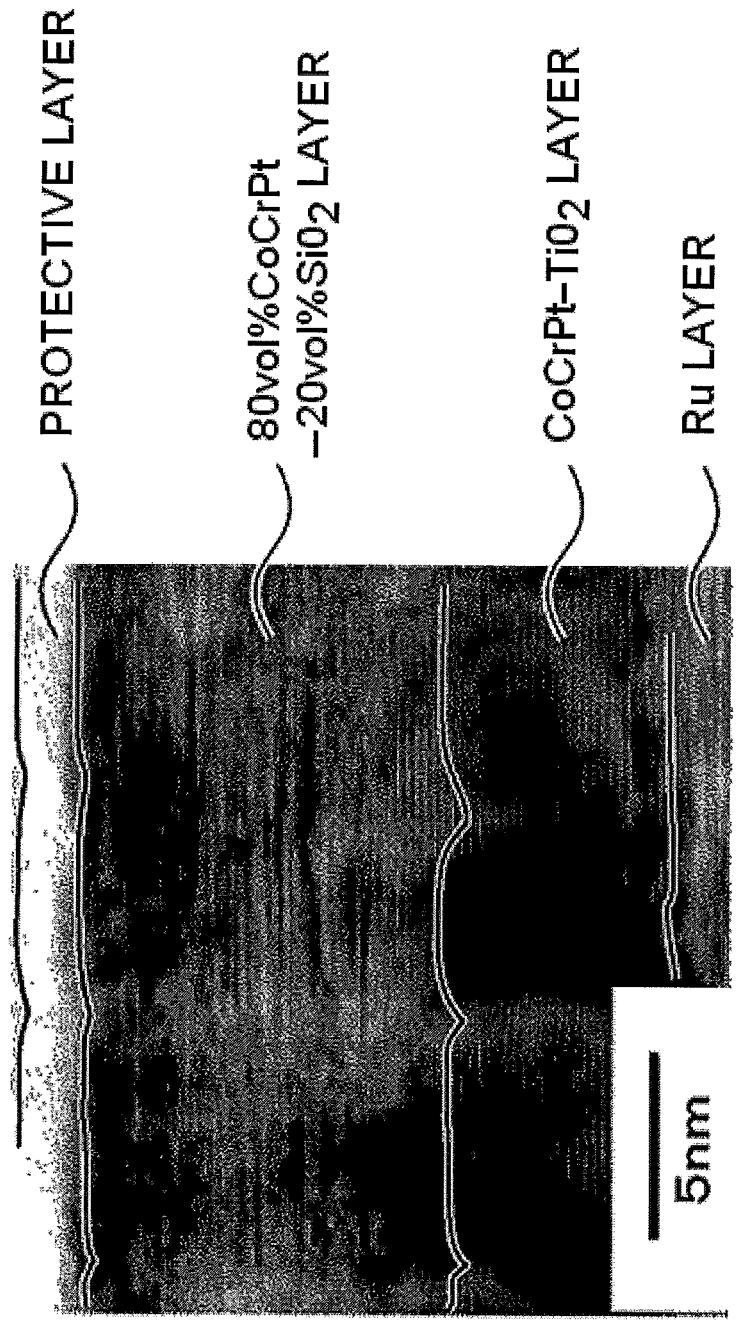
FIG. 5 is an observation example of a TEM image of an upper magnetic recording layer formed out of a 80 vol % ($Co_{80}Cr_{15}Pt_5$)-20 vol % $SiO_2$ target, in Comparative example 2.

FIG. 5 illustrates TEM observation results of a sample, in Comparative Example 2, in which the upper magnetic recording layer was formed out of a 80 vol % $(Co_{80}Cr_{15}Pt_5)$-20 vol % $SiO_2$ target (y=20 in Table 2). It is found that there are virtually no irregularities at the CoCrPt—$SiO_2$ layer surface.

The results of arithmetic mean roughness Ra, average length of roughness curve elements RSm, Ra/RSm, SNR characteristic and write track width for the samples prepared in Example 1, Comparative Example 2 and Example 3 are summarized in Table 1, Table 2 and Table 3, respectively. Products were determined to be good, in terms of the goal of achieving good signal characteristics at high recording density, if the SNR was 10 dB or greater, and the write track width 90 nm or smaller.

The results reveal that Ra increases as the non-magnetic portion ($SiO_2$, C, $B_4C$) in the non-magnetic portion of the granular structure becomes greater. This tendency varies depending on the material of the non-magnetic portion in the granular structure, and is more significant for C and $B_4C$ than for $SiO_2$. That is, Ra becomes significantly greater when the proportion of a carbon-based material, such as C or $B_4C$, increases in the granular structure. This can be attributed to the greater difference in surface energy between grain components of CoCrPt or FePt and the carbon-based material such as C or $B_4C$, compared to the oxides such as $SiO_2$ and $TiO_2$.

It is found that the write track width expands if Ra/RSm is smaller than 0.05. This is deemed to arise from the fact that heat cannot be dissipated appropriately because thermal diffusion from the surface is small.

In Comparative Example 2, SNR drops upon increase of the non-magnetic portion, such that the SNR becomes smaller than 10 dB when the non-magnetic portion is 50 vol % or more. This can be attributed to the drop in the volume ratio of the magnetic material that contributes to signal intensity.

The SNR evaluation revealed that noise arising from hit to the head surface was substantial when Ra/RSm was greater than 0.15, as in Examples 1 and 3. This effect can be attributed to instability in head flying on account of surface roughness, and the resulting worsening of the SNR.

From all the above it follows that a magnetic recording medium can be achieved that is appropriate for heat-assisted recording devices when the proportion of a non-magnetic portion in a magnetic recording layer having a granular structure ranges from 15 vol % to 30 vol %, and the Ra/RSm of the surface ranges from 0.05 to 0.15.

It is also found that a carbon-based material used in the non-magnetic portion is effective to achieve a Ra/RSm ranging from 0.05 to 0.15 in the surface of the granular magnetic recording layer.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A magnetic recording medium for a heat-assisted recording device, comprising, in the order recited:
   a non-magnetic substrate;
   a magnetic recording layer;
   a protective layer; and
   a liquid lubricating layer,
   wherein the magnetic recording layer has a granular structure formed by magnetic portions and non-magnetic portions that surround the magnetic portions in which the non-magnetic portions between adjacent magnetic portions are recessed with respect to the magnetic portions, the non-magnetic portions having a volume percentage based on total volume of the granular structure ranging from 15 vol % to 30 vol % and including a carbon-based material, and
   wherein the magnetic recording medium has a surface having an arithmetic mean roughness Ra and an average length of roughness curve elements RSm such that Ra/RSm ranges from 0.05 to 0.15.

2. The magnetic recording medium according to claim 1, wherein the carbon-based material is C.

3. The magnetic recording medium according to claim 2, wherein the volume percentage ranges from 20 vol % to 30 vol %.

4. The magnetic recording medium according to claim 1, wherein the carbon-based material is $B_4C$.

5. The magnetic recording medium according to claim 1, further comprising at least one layer selected from the group consisting of a soft magnetic underlayer, an interlayer, and a heat sink layer provided between the non-magnetic substrate and the magnetic recording layer.

6. A magnetic recording medium for a heat-assisted recording device, comprising, in the order recited:
   a non-magnetic substrate;
   a magnetic recording layer comprising, in the order recited, a lower magnetic recording layer, an exchange coupling control layer, and an upper magnetic recording layer;
   a protective layer; and
   a liquid lubricating layer,
   wherein the lower magnetic recording layer and the upper magnetic recording layer each have a granular structure formed by magnetic portions and non-magnetic portions that surround the magnetic portions in which the non-magnetic portions between adjacent magnetic portions of the upper magnetic recording layer are recessed with respect to the magnetic portions of the upper magnetic recording layer, each respective non-magnetic portion having a volume percentage ranging from 15 vol % to 30 vol %, and at least one of the lower magnetic recording layer and the upper magnetic recording layer including a carbon-based material, and
   wherein the magnetic recording medium has a surface having an arithmetic mean roughness Ra and an average length of roughness curve elements RSm such that Ra/RSm ranges from 0.05 to 0.15.

7. The magnetic recording medium according to claim 6, wherein the carbon-based material is C.

8. The magnetic recording medium according to claim 7, wherein the volume percentage ranges from 20 vol % to 30 vol %.

9. The magnetic recording medium according to claim 6, wherein the carbon-based material is $B_4C$.

10. The magnetic recording medium according to claim 6, further comprising at least one layer selected from the group consisting of a soft magnetic underlayer, an interlayer, and a heat sink layer provided between the non-magnetic substrate and the magnetic recording layer.

11. A method for manufacturing a magnetic recording medium for a heat-assisted recording device, comprising the steps of:
   providing a non-magnetic substrate;
   forming a magnetic recording layer on the non-magnetic substrate, the magnetic recording layer having a granular structure formed by magnetic portions and non-magnetic portions that surrounds the magnetic portions in which the non-magnetic portions between adjacent magnetic portions are recessed with respect to the magnetic portions;
   forming a protective layer on the magnetic recording layer; and
   forming a liquid lubricating layer on the protective layer,
   wherein the non-magnetic portions have a volume percentage based on total volume of the granular structure that ranges from 15 vol % to 30 vol %, and include a carbon-based material, and
   wherein the magnetic recording medium has a surface having an arithmetic mean roughness Ra and an average length of roughness curve elements RSm such that Ra/RSm ranges from 0.05 to 0.15.

12. The method according to claim 11, wherein the carbon-based material is C.

13. The method according to claim 12, wherein the volume percentage ranges from 20 vol % to 30 vol %.

14. The method according to claim 11, wherein the carbon-based material is $B_4C$.

15. The method according to claim 11, further comprising the step of forming at least one layer selected from the group consisting of a soft magnetic underlayer, an interlayer, and a heat sink layer provided between the non-magnetic substrate and the magnetic recording layer.

16. A method for manufacturing a magnetic recording medium for a heat-assisted recording device, comprising the steps of:
   providing the non-magnetic substrate;
   forming a lower magnetic recording layer on a non-magnetic substrate;
   forming an exchange coupling control layer on the lower magnetic recording layer;
   forming an upper magnetic recording layer on the exchange coupling control layer;
   forming a protective layer on the upper magnetic recording layer; and
   forming a liquid lubricating layer on the protective layer,
   wherein the lower magnetic recording layer and the upper magnetic recording layer each have a granular structure formed by magnetic portions and non-magnetic portions that surround the magnetic portions in which the non-magnetic portions between adjacent magnetic portions of the upper magnetic recording layer are recessed with respect to the magnetic portions of the upper magnetic recording layer, each respective non-magnetic portion having a volume percentage ranging from 15 vol % to 30 vol %, and at least one of the lower magnetic recording layer and the upper magnetic recording layer includes a carbon-based material, and
   wherein the magnetic recording medium has a surface having an arithmetic mean roughness Ra and an average length of roughness curve elements RSm such that Ra/RSm ranges from 0.05 to 0.15.

17. The method according to claim 16, wherein the carbon-based material is C.

18. The method according to claim 17, wherein the volume percentage ranges from 20 vol % to 30 vol %.

19. The method according to claim 16, wherein the carbon-based material is $B_4C$.

20. The method according to claim 16, further comprising the step of forming at least one layer selected from the group consisting of a soft magnetic underlayer, an interlayer, and a heat sink layer provided between the non-magnetic substrate and the magnetic recording layer.

* * * * *